W. A. LAYMAN.
ALTERNATING CURRENT MOTOR.
APPLICATION FILED JULY 29, 1909.

952,532.

Patented Mar. 22, 1910.

2 SHEETS—SHEET 2.

WITNESSES:
L. L. Mead.
W. A. Alexander

INVENTOR
W. A. Layman
BY Fowler & Huffman
ATTORNEYS

UNITED STATES PATENT OFFICE.

WALDO A. LAYMAN, OF WEBSTER GROVES, MISSOURI.

ALTERNATING-CURRENT MOTOR.

952,532.  Specification of Letters Patent.  Patented Mar. 22, 1910.

Application filed July 29, 1909. Serial No. 510,205.

*To all whom it may concern:*

Be it known that I, WALDO A. LAYMAN, a citizen of the United States, residing at the town of Webster Groves, in the county of St. Louis, State of Missouri, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to that type of alternate current motor which starts as a series induction or "repulsion" machine and operates as a self-excited shunt induction motor being converted from the former to the latter form of motor after a sufficient speed has been reached.

My object is to improve the starting and running performance of such machines, to make their action as automatic as possible, necessitating a very small amount of manipulation on the part of the attendant, and to improve their power factor.

Motors of the said type are known in which a commuted winding is used on the induced member, generally the rotor, this winding being short-circuited at starting by means of brushes disposed along an axis not coinciding with that of the main inducing or stator winding. Such machines start as series induction motors. When up to speed a number of points of the rotor winding are short-circuited independently of the brushes and the latter are sometimes lifted off. One of the difficulties which arises with such motors is that the position of the short-circuited brushes which gives the most desirable speed torque curve does not coincide with that position of these same brushes which secures the best commutation at starting. Another difficulty is the somewhat low power factor of such a combination. I overcome these difficulties by providing the rotor with an additional commuted winding connected to a commutator of its own. I make use of this commuted winding to increase the starting torque and to improve the power factor, *i. e.*, to compensate the motor in normal operation.

When making use of this auxiliary commuted winding to improve the starting torque I am able to place the short-circuited brushes on the other commutator in such a position as to secure a better commutation than would otherwise be possible for the same starting torque.

Figure 1:
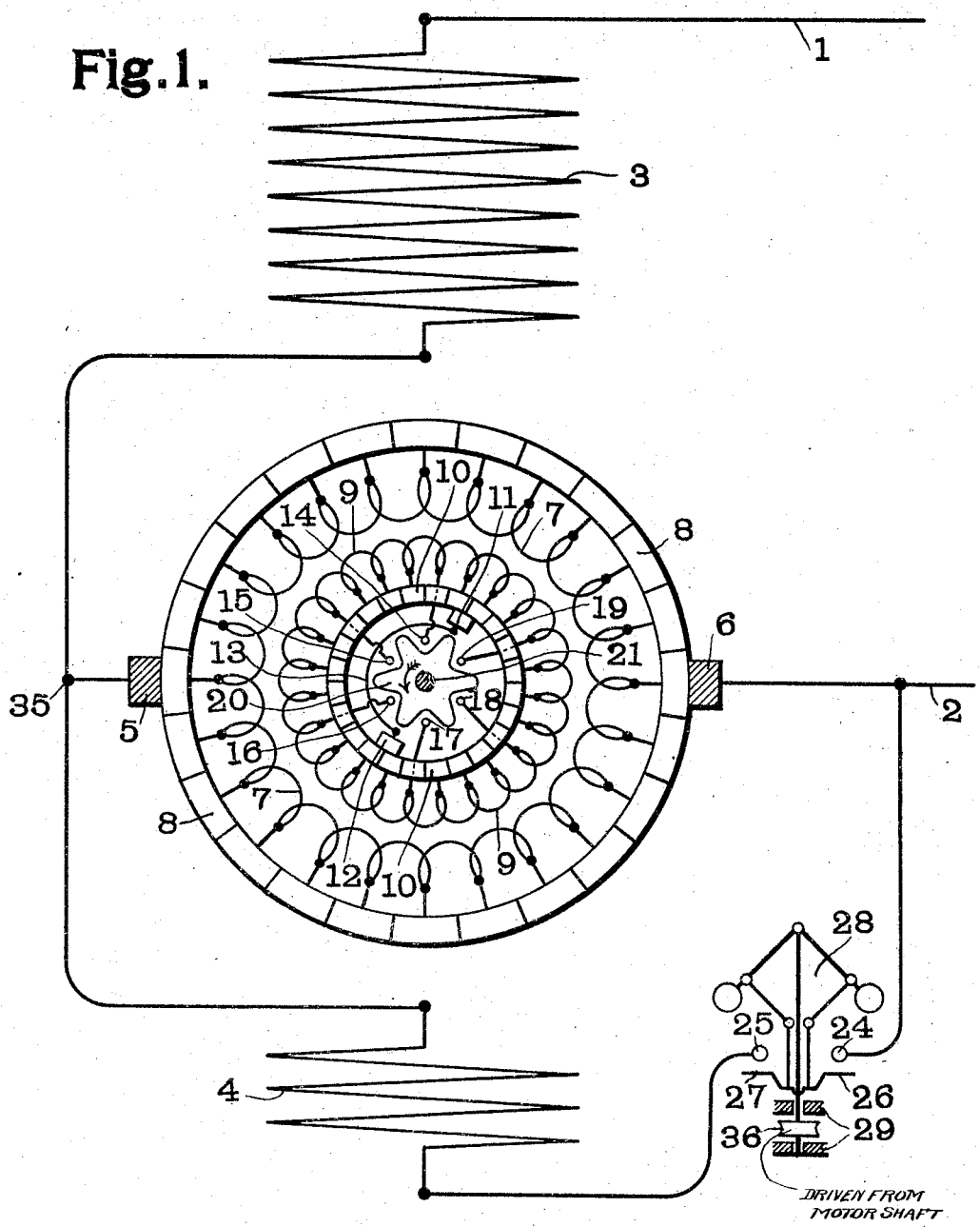
Figure 2:
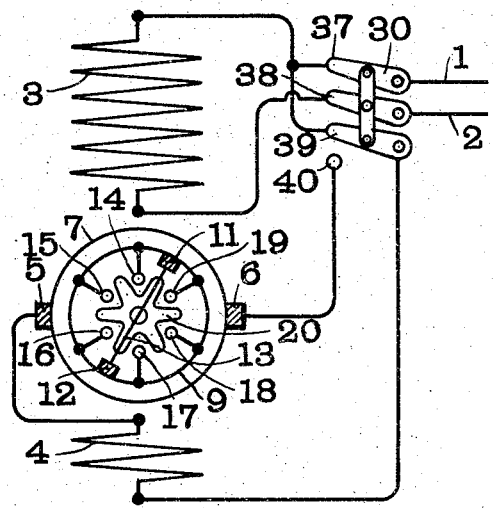
Figure 3:
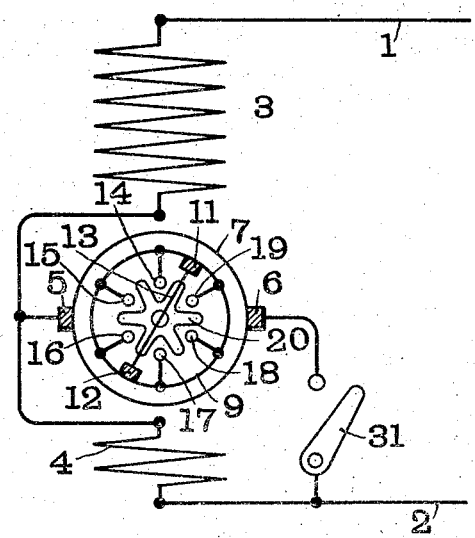
Figure 4:
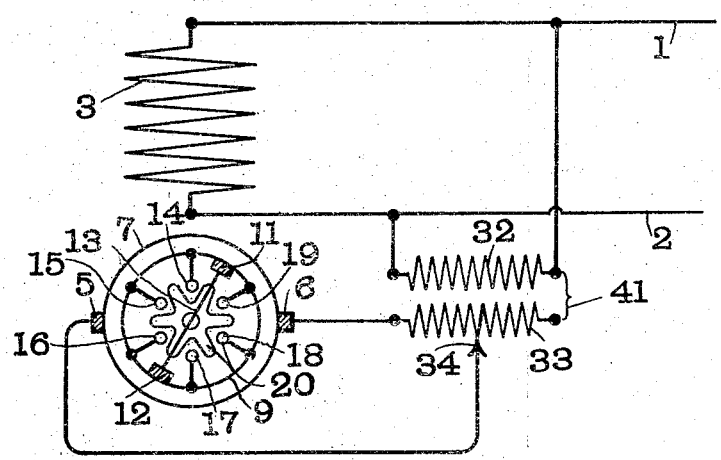

In the accompanying drawings Figure 1 is a diagrammatic view of the preferred form of my improved motor; Fig. 2 shows how the compensating E. M. F. can be derived from an independent stator winding, and in this case the auxiliary commuted winding is used only in normal operation; Fig. 3 is a modification of Fig. 1; Fig. 4 shows another way of connecting the auxiliary commuted winding at starting and also indicates how the compensating E. M. F. can be derived from a transformer independent of the motor.

Referring to Fig. 1 which discloses the starting connections in one form of my improved motor, the rotor carries two commuted windings 7, 9 respectively connected to the commutators 8 and 10. The main stator inducing winding 3 is connected in series with the auxiliary commuted winding 7 by way of the brushes 5 and 6, the two windings being connected to the mains 1 and 2. The other rotor winding 9 is connected to the commutator 10 carrying two brushes 11, 12 short-circuited by conductor 13 and disposed along an axis not coinciding with that of the magnetization produced by the main stator winding 3. At the moment of starting the brushes 11, 12 rest on the commutator 10 causing the machine to start as a self-excited series induction motor. When a sufficient speed has been reached then a number of points of the commuted winding 9 are short-circuited independently of the brushes 11, 12. This operation is performed by means of a star-shaped conductive body 20 capable of revolving about the motor shaft. For this purpose this body is moved in the direction indicated by the curved arrow in Fig. 1 and engages with the points 14, 15, 16, 17, 18 and 19 of 9, thus short-circuiting six points of 9. The stator also carries an auxiliary winding 4 coaxially disposed with 3. One end of 4 is directly connected to brush 5 at point 35, the other is connected to brush 6 by way of the centrifugally controlled switch 28. Brush 6 is not only connected to main 2 but also to point 24 of the automatic switch 28. Contact 25 of that switch is connected to 4. The bearings of the centrifugal device 28 are indicated at 29. The centrifugal device is geared to the motor shaft in any desired manner, for instance by means of the pulley 36. When the motor has reached a sufficient speed the movable switch contacts 26, 27 complete the circuit between points 25 and 24 whereby a compensating E. M. F. derived from 4 is impressed on the auxiliary commuted winding. The fact that the auxiliary commuted winding 7 is connected in series with the main stator winding 3 at starting while the main rotor winding is short-circuited along an axis more or less displaced with respect to that of 3 causes the motor to start as a separately excited series induction motor. In this way the auxiliary commuted winding is made to contribute to the starting torque. The brushes 5, 6 are preferably displaced by about 180/n degrees with respect to the axis of the main stator winding, the letter n designating the number of poles of the motor. It is not necessary to lift brushes 11, 12 off 10 when up to speed but I prefer to do so. Connection between points 25 and 24 can of course be made by hand instead of by means of an automatic switch.

In Fig. 2 the winding 4 from which the compensating E. M. F. is derived is not electrically connected to the stator inducing winding 3 but is nevertheless disposed on the stator and preferably coaxially with 3. The compensating circuit is here supposed to be closed by hand. At starting switch 30 stands in the position shown in Fig. 2. When the motor has reached a sufficient speed the switch is moved so that it stands on points 38, 39 and 40 instead of points 37, 38 and 39 whereby the brushes 5, 6 are connected to winding 4.

In Fig. 3 is shown a modification of Fig. 1, the current at starting being taken through the compensating winding 4 in series with the main inducing winding 3 instead of being taken through the auxiliary commuted winding in series with 3. When a sufficient speed has been reached and it is desired to compensate the motor then switch 31 is closed thus reinstating the operating conditions obtaining in Fig. 1. Switch 31 can be closed automatically if desired. A number of points of the commuted winding are also short-circuited after a sufficient speed has been reached by the same means illustrated in Fig. 1.

In Fig. 4 the brushes 5 and 6 are connected to the secondary 33 of the transformer 41, its primary 32 is connected across the mains. At starting a comparatively large E. M. F. is impressed on the auxiliary commuted winding 7 by way of the brushes 5, 6 thus causing 7 to contribute to the torque of the motor. When the motor has reached a sufficient speed the E. M. F. derived from 41 is reduced to an amount suitable for compensating the motor, for this purpose the secondary of 41 can be regulated at 34. As the speed increases the contact 34 is therefore preferably moved so as to decrease the E. M. F. impressed on the brushes 5, 6 thus raising the power factor of the motor. When the motor has reached a sufficient speed the commuted winding 9 is short-circuited in some such way as indicated in Fig. 1 and the short-circuited brushes can be lifted off if desired.

Having fully described my invention, what I claim as new and desire to secure by Letters Patent of the United States, is:—

1. In an alternate current motor, the combination of a stator, a main inducing winding on the stator, a rotor, a commuted winding on the rotor short-circuited by means of brushes, means for short-circuiting a number of points of said commuted winding after a certain speed has been reached, a second commuted winding on the rotor, and means for impressing a compensating E. M. F. on said second commuted winding.

2. In an alternate current motor, the combination of a stator, a main inducing winding on the stator, a rotor, a commuted winding on the rotor short-circuited by means of brushes along an axis displaced from that of the main inducing winding, means for short-circuiting a number of points of said commuted winding after a certain speed has been reached, a second commuted winding on the rotor, and means for impressing a compensating E. M. F. on said second commuted winding.

3. In an alternate current motor, the combination of a stator, a main inducing winding on the stator, a rotor, a commuted winding on the rotor short-circuited by means of brushes along an axis displaced from that of the main inducing winding, means for short-circuiting a number of points of said commuted winding after a certain speed has been reached, a second commuted winding on the rotor connected in series relation to the main inducing winding, and means for impressing a compensating E. M. F. on said second commuted winding.

4. In an alternate current motor, the combination of a stator, a main inducing winding on the stator, a rotor, a commuted winding on the rotor short-circuited by means of brushes along an axis displaced from that of the main inducing winding, means for short-circuiting a number of points of said commuted winding after a certain speed has been reached, a second commuted winding on the rotor connected in series relation to the main inducing winding at starting, and an auxiliary winding on the stator for impressing a compensating E. M. F. on said second commuted winding.

In testimony whereof I have hereunto set my hand and affixed my seal in the presence of the two subscribing witnesses.

WALDO A. LAYMAN. [L. S.]

Witnesses:
H. H. SWINGLEY,
C. B. BENNETT.